(12) United States Patent
Panus et al.

(10) Patent No.: US 10,924,477 B2
(45) Date of Patent: Feb. 16, 2021

(54) SYSTEM AND METHODS FOR CLIENT IDENTIFICATION AND VERIFICATION

(71) Applicant: Mastercard International Incorporated, Purchase, NY (US)

(72) Inventors: Sheila R. Panus, O'Fallon, MO (US);
Steve Podgorski, Defiance, MO (US);
Sameer Tare, Ballwin, MO (US);
Suman Rausaria, Ballwin, MO (US);
Eric R. Kitchen, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 468 days.

(21) Appl. No.: 15/846,028

(22) Filed: Dec. 18, 2017

(65) Prior Publication Data

US 2019/0190907 A1    Jun. 20, 2019

(51) Int. Cl.
*G06F 21/00*    (2013.01)
*H04L 29/06*    (2006.01)
*G06Q 20/40*    (2012.01)
*G06Q 30/00*    (2012.01)

(52) U.S. Cl.
CPC ..... *H04L 63/0861* (2013.01); *G06Q 20/4016* (2013.01); *G06Q 20/40145* (2013.01); *G06Q 30/018* (2013.01); *H04L 63/102* (2013.01); *H04L 63/20* (2013.01); *H04L 2463/102* (2013.01)

(58) Field of Classification Search
CPC ... H04L 63/0861; H04L 63/102; H04L 63/20; H04L 2463/102; G06Q 30/018; G06Q 20/4016; G06Q 20/40145
See application file for complete search history.

(56) References Cited

U.S. PATENT DOCUMENTS

| 8,165,938 | B2 * | 4/2012 | Monk | G06Q 20/10 |
| | | | | 705/35 |
| 9,064,285 | B1 * | 6/2015 | Nathoo | G06Q 10/1053 |
| 2013/0317975 | A1 * | 11/2013 | Gage | G06Q 30/0601 |
| | | | | 705/39 |
| 2014/0249999 | A1 * | 9/2014 | Johnson | G06Q 20/0855 |
| | | | | 705/39 |
| 2015/0081545 | A1 * | 3/2015 | Gissler | G06Q 20/322 |
| | | | | 705/44 |

* cited by examiner

*Primary Examiner* — Kendall Dolly
(74) *Attorney, Agent, or Firm* — Hovey Williams LLP

(57) ABSTRACT

A system and computer-implemented method for client identification and verification includes a memory device for storing data and a processor communicatively coupled to the memory device. The processor is programmed to receive merchant identification data corresponding to a merchant. The merchant identification data includes identification data relating to the identity of the merchant and a primary authorized user for the merchant. The processor is also programmed to generate a merchant profile from the merchant identification data for the merchant, and generate an activation code for the primary authorized user based on the merchant profile. The activation code is transmitted to the primary authorized user. The processor receives, from the primary authorized user, one or more biometrics of the authorized user, validates the biometrics of the authorized user, and upon validation of the biometrics, activates a merchant account.

20 Claims, 9 Drawing Sheets

SYSTEM AND METHODS FOR CLIENT IDENTIFICATION AND VERIFICATION

FIELD OF THE DISCLOSURE

The field of the disclosure relates generally to systems and methods for client identification and verification and, more particularly, to systems and methods for an automated process to identify and verify a client and its primary authorized user during onboarding of the client.

BACKGROUND OF THE DISCLOSURE

Use of relatively open networks, such as the Internet, to transact confidential communications, financial transactions, and the like is pervasive and entrenched in our society. The need for verifying the identity of an entity has become increasingly important. In particular, phishing attacks are common and can create valid concern about who one is communicating with.

When a custodian of confidential information is requested by a specific entity to provide the confidential information, such as analytical reports, financial account information, or other types of information concerning private or financial matters, authentication of the entity is of particular concern. It is important for the custodian delivering the confidential information to authenticate, i.e., identify and verify, that the entity requesting the confidential information is entitled to receive the confidential information.

At least some existing processes for authenticating entities include a manual process where a person physically identifies and verifies the entity and provides an access code used for generating an online account for transacting with the custodian of confidential information. However, such a process is error prone and risks creating fraudulent entities. In addition, once the online account has been activated, there is typically no ongoing process for authenticating a user accessing the online account.

BRIEF DESCRIPTION OF THE DISCLOSURE

This summary is not intended to identify essential features of the present invention, and is not intended to be used to limit the scope of the claims. These and other aspects of the present invention are described below in greater detail.

In one aspect, an identity verification system for client identification and verification is provided. The identity verification system includes a memory device for storing data and a processor communicatively coupled to the memory device. The processor is programmed to receive merchant identification data corresponding to a merchant. The merchant identification data includes identification data relating to the identity of the merchant and a primary authorized user for the merchant. The processor is also programmed to generate a merchant profile from the merchant identification data for the merchant, and to generate an activation code for the primary authorized user based on the merchant profile. Furthermore, the processor is programmed to transmit the activation code to the primary authorized user, and to receive, from the primary authorized user, one or more biometrics of the authorized user. Moreover, the processor is programmed to validate the one or more biometrics of the authorized user and, upon validation of the biometrics, activate a merchant account.

In another aspect, a computer-implemented method for client identification and verification is provided. The method includes receiving merchant identification data corresponding to a merchant. The merchant identification data includes identification data relating to the identity of the merchant and a primary authorized user for the merchant. The method also includes generating a merchant profile from the merchant identification data for the merchant, and generating an activation code for the primary authorized user based on the merchant profile. Furthermore, the method includes transmitting the activation code to the primary authorized user, and receiving from the primary authorized user one or more biometrics of the authorized user. Moreover, the method includes validating the one or more biometrics of the authorized user and, upon validation of the biometrics, activating a merchant account.

In yet another aspect, one or more non-transitory computer-readable storage media having computer-executable instructions embodied thereon is provided. When executed by at least one processor, the computer-executable instructions cause the processor to receive merchant identification data corresponding to a merchant. The merchant identification data includes identification data relating to the identity of the merchant and a primary authorized user for the merchant. In addition, the executable instructions cause the processor to generate a merchant profile from the merchant identification data for the merchant, and to generate an activation code for the primary authorized user based on the merchant profile. Furthermore, the executable instructions cause the processor to transmit the activation code to the primary authorized user, and to receive from the primary authorized user one or more biometrics of the authorized user. Moreover, the executable instructions cause the processor to validate the one or more biometrics of the authorized user and, upon validation of the biometrics, to activate a merchant account.

BRIEF DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale. Like numbers in the Figures indicate the same or functionally similar components.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. It is contemplated that the invention has general application to identifying and verifying entities requesting access to confidential information and/or financial services. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, operation, etc. described in one embodiment may also be included in other embodiments, but is not necessarily included. Thus, particular implementations of the present invention can include a variety of combinations and/or integrations of the embodiments described herein.

Broadly characterized, the present invention relates to systems and methods for client identification and verification. More particularly, the disclosed embodiments provide a system and computer-implemented method for automating a process to identify and verify a client and its primary authorized user during onboarding of the client. In one example embodiment, an identity verification and onboarding (IVO) module is configured for use with a payment card processing network such as, for example, an interchange network. The IVO module includes a memory device and a processor in communication with the memory device and is programmed to communicate with the interchange network to receive client (e.g., merchants, acquirers, and/or issuers) identification data, including user profile data, for a plurality of clients. The IVO module verifies the client identification data and provides a process for authenticating the user. Subsequent access to the interchange network by the user requires authentication of the user via one or more biometrics (i.e., one or more scans or digital representations of physical features of the user).

Figure 1:
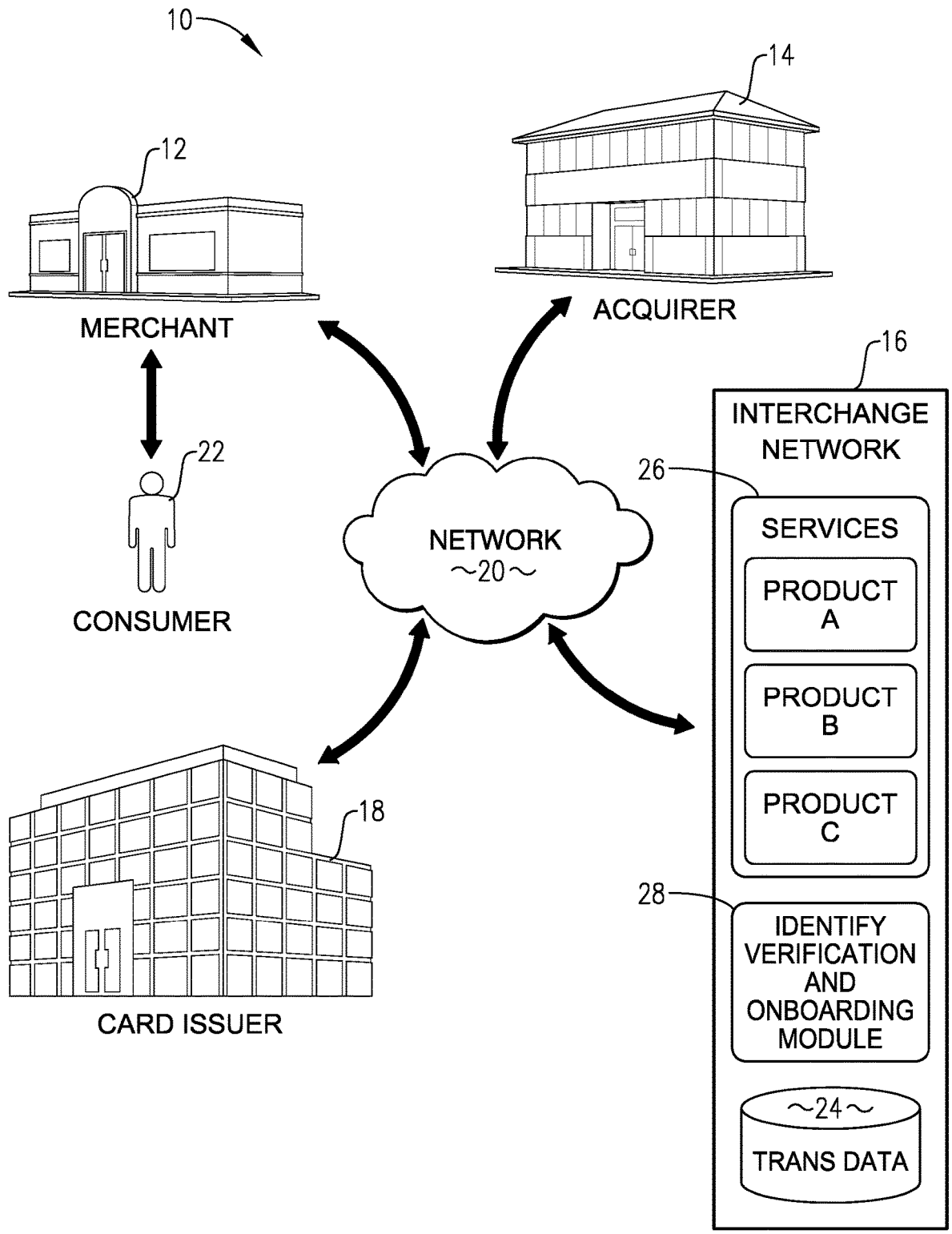
FIG. 1 is a block diagram of an example multi-party payment card network system having an identity verification and onboarding module (IVO module)

FIG. 1 is a block diagram of an example multi-party payment card network system 10 having an identity verification and onboarding module 28 (IVO module). The payment card network system 10 facilitates distributing interchange network services 26 offered by an interchange network 16 and enables payment-by-card transactions in which merchants 12, acquirers 14, and/or card issuers 18 do not need to have a one-to-one relationship. The IVO module 28 is a specially programmed computer system that enables the interchange network 16 to implement an automated process to identify and verify merchants and primary authorized users 34 (not shown in FIG. 1) during onboarding. Typically, the primary authorized user 34 is an employee of a client of the interchange network 16 that is authorized by the client to access one or more of the interchange network services 26. In the example embodiment, the client includes one or more of the merchants 12. While the client is described herein as being a merchant 12, it is contemplated that the client may be one of the acquirers 14 and/or the issuers 18. The IVO module 28 is specially programmed with a plurality of algorithms that are configured to receive various amounts of identification data from the client (i.e., the authorized user 34) and verification and risk data from other sources of information and/or communications. The combined data is used to generate a client profile. The client profile is stored in a database (not shown in FIG. 1), which functions as a common repository of detailed client profile data including risk assessments.

In the example embodiment, the payment card network system 10 generally includes the merchants 12, the acquirers 14, the interchange network 16, and the issuers 18, coupled in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 20 may include more than one type of network, such as a private payment transaction network provided by the interchange network 16 to the acquirers 14 and the issuers 18 and, separately, the public Internet, which may facilitate communication between the merchants 12, the interchange network 16, the acquirers 14, and the consumers 22, etc.

Embodiments described herein may relate to a transaction card system, such as a credit card payment system using the Mastercard® interchange network. (Mastercard is a registered trademark of MasterCard International Incorporated). The Mastercard interchange network is a set of proprietary communications standards promulgated by Mastercard International Incorporated for the exchange of financial transaction data and the settlement of funds between financial institutions that are members of Mastercard International Incorporated. As used herein, financial transaction data includes a unique account number associated with an account holder using a payment card issued by an issuer, purchase data representing a purchase made by the cardholder, including a type of merchant, amount of purchase, date of purchase, and other data, which may be transmitted between any parties of multi-party payment card network system 10.

In a typical transaction card system, a financial institution called the "issuer" issues a transaction card, such as a credit card, to a cardholder or consumer 22, who uses the transaction card to tender payment for a purchase from the merchant 12. In the example embodiment, the merchant 12 is typically associated with products, for example, and without limitation, goods and/or services, that are offered for sale and are sold to the consumers 22. The merchant 12 includes, for example, a physical location and/or a virtual location. A physical location includes, for example, a brick-and-mortar store, etc., and a virtual location includes, for example, an Internet-based store-front.

To accept payment with the transaction card, the merchant 12 must normally establish an account with a financial institution that is part of the payment card network system 10. This financial institution is usually called the "merchant bank," the "acquiring bank," or the acquirer 14. When the cardholder 22 tenders payment for a purchase with a transaction card, the merchant 12 requests authorization from the acquirer 14 for the amount of the purchase. The request may be performed over the telephone, but is usually performed through the use of a point-of-sale terminal that reads the cardholder's account information from a magnetic stripe, a chip, or embossed characters on the transaction card and communicates electronically with the transaction processing computers of the acquirer 14. Alternatively, the acquirer 14 may authorize a third party to perform transaction processing on its behalf. In this case, the point-of-sale terminal will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the cardholder's 22 account is in good standing and whether the purchase is covered by the cardholder's 22 available credit line. Based on these determinations, the request for authorization will be declined or accepted. If the request is accepted, an authorization code is issued to the merchant 12.

When a request for authorization is accepted, the available credit line of the cardholder's 22 account is decreased. Normally, a charge for an online payment card transaction is not posted immediately to the cardholder's 22 account because bankcard associations, such as Mastercard International Incorporated, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder 22 cancels a transaction before it is captured, a "void" is generated. If the cardholder 22 returns goods after the transaction has been captured, a "credit" is generated. The interchange network 16 and/or the issuer 18 stores the transaction card information, such as, and without limitation, a type of merchant, a merchant identifier, a location where the transaction was completed, an amount of purchase, and a date and time of the transaction, in a transaction database 24.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer 18, the cardholder's account is decreased. Normally, a charge is posted immediately to the cardholder's account. The interchange network 16 transmits the approval to the acquirer 14 for distribution of goods/services or information, or cash in the case of an automated teller machine (ATM).

After a transaction is authorized and cleared, the transaction is settled among the merchant 12, the acquirer 14, and the issuer 18. Settlement refers to the transfer of financial data or funds among the merchant's 12 account, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12.

With continued reference to FIG. 1, the interchange network 16 offers or provides one or more services 26 to one or more of the merchants 12 (i.e., the client). The services may be referred to as value-added services, for example, in that the services are often provided in addition to the standard payment card network object of coordinating authorization of transactions performed by the consumer 22. Example services include, for example and without limitation, fraud services (e.g., fraud scoring, etc.), loyalty services (e.g., managing reward points, etc.), account control services (e.g., transaction limits, etc.), authentication services, routing intelligence services, message transformation services (e.g., format and/or standard conversions, etc.), services for applying additional derived data and/or insights to transaction messages, identification of other value added services to be applied, etc. To provide and manage the value-added services for the merchants 12, the merchants 12 are screened and input into the interchange network 16 as a client (i.e., the merchants are "onboarded") for one or more of the value-added services.

Figure 2:
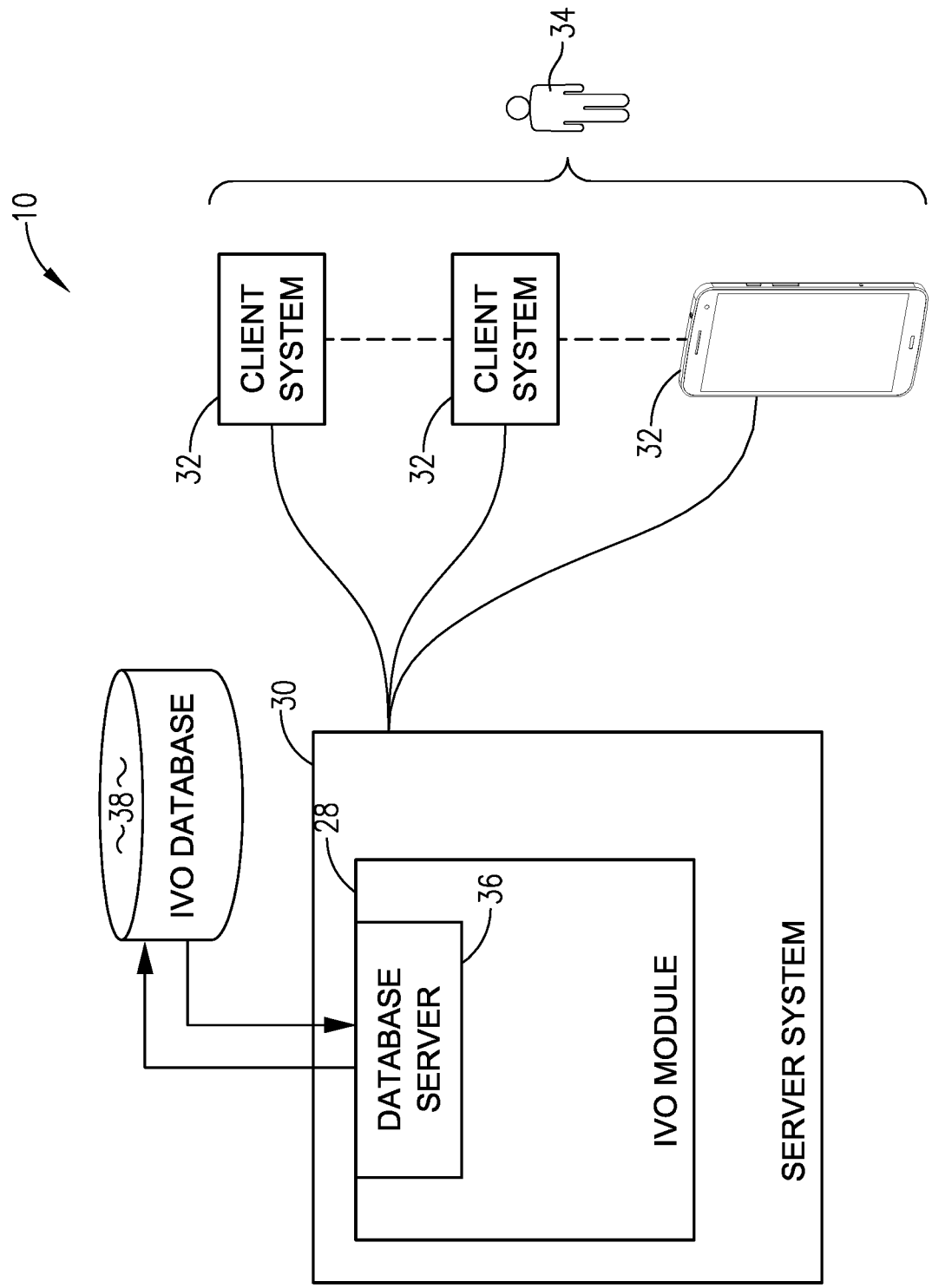
FIG. 2 is a simplified block diagram of an example payment card network system, such as the payment card network system shown in FIG. 1, including a plurality of computing devices and the IVO module shown in FIG. 1.

FIG. 2 is a simplified block diagram of an example payment card network system, such as the payment card network system 10, including a plurality of computing devices and the IVO module 28. In the example embodiment, the plurality of computing devices includes, for example, a server system 30, client systems 32, and the IVO module 28. In one embodiment, the payment card network system 10 implements a process to onboard the merchants 12. More specifically, the IVO module 28 is in communication with the server system 30 and may be a component of the server system 30 or a separate computing device. The IVO module 28 is configured to receive identification data relating to the identity of the merchant 12 and the primary authorized user 34. The identification data includes identifying information of the merchant 12, such as merchant name, business location, financial information, etc., and the primary authorized user 34, such as the user's name, business email address, password, cellular phone number, etc. The identifying information is stored in a memory device and/or database. In one embodiment, the identification data is received from one or more sources including, for example, an existing Member Alert to Control High-Risk Merchants (MATCH) database or system (e.g., a MASTERCARD MATCH® brand database) (not shown in FIG. 2), and/or the authorized user 34 via one or more of the client systems 32.

More specifically, in the example embodiment, the payment card network system 10 includes the server system 30 and a plurality of client sub-systems, also referred to as the client systems 32, connected to the server system 30. In one embodiment, the client systems 32 are computers including a web browser, such that server system 30 is accessible to the client systems 32 using the Internet. The client systems 32 are interconnected to the Internet through one or more of any variety of interfaces including, for example, a network, such as a LAN or WAN, dial-in-connections, cable modems, and/or special high-speed Integrated Services Digital Network (ISDN) lines. The client systems 32 could be any device capable of interconnecting to the Internet including an Internet connected phone, a PDA, or any other suitable web-based connectable equipment.

A database server 36 is connected to an IVO database 38, which is configured to store information on a variety of matters, including the merchant identification data as described below in greater detail. In one embodiment, the IVO database 38 is a centralized database stored on the server system 30 and can be accessed by potential users at one of the client systems 32 by logging onto the server system 30 through one of the client systems 32. In an alternative embodiment, the IVO database 38 is stored remotely from the server system 30 and may be a distributed or non-centralized database.

In one example embodiment, the IVO database 38 may include a single database having separated sections or partitions or may include multiple databases, each being separate from each other. The IVO database 38 stores the merchant identification data in a merchant or client profile including, for example, a merchant's name, a merchant's address, a merchant identifier that identifies each unique merchant registered to use the network's service 26 (also referred to as a merchant, client, or company ID), and other client identifier information. In some embodiments, for example, where the IVO database 38 includes separate sections, partitions, or multiple databases, the IVO database 38 may be configured to store transaction data generated as part of sales activities conducted over the payment card network system 10 including data relating to account holders or consumers 22, issuers 18, acquirers 14, and purchases made. For example, the IVO database 38 may store account data including at least one of an account holder's name, an account holder's address, a primary account number (PAN) associated with the account holder's name, and other account identifier. The IVO database 38 may also store merchant data including instructions for settling transactions including merchant bank account information. The IVO database 38 may also store purchase data associated with items being purchased by an account holder from a merchant and authorization request data. Furthermore, the IVO database 38 may store picture files associated with the item or service for sale by the merchant 12, name, price, description, shipping and delivery information, instructions for facilitating the transaction, and other information to facilitate processing according to the method described in the present disclosure.

In the example embodiment, one of the client systems 32 may be associated with the merchant 12 (shown in FIG. 1) while another one of the client systems 32 may be associated with the acquirer 14 (shown in FIG. 1) or the issuer 18 (shown in FIG. 1). The server system 30 may be associated with the interchange network 16. In the example embodiment, the server system 30 is associated with a financial transaction processing network, such as the interchange network 16, and may be referred to as an interchange computer system. The server system 30 may be used for processing merchant identification and verification data as well as transaction data. In addition, the client systems 32 may include a computer system associated with at least one of a merchant, an online bank, a bill payment outsourcer, an acquirer bank, an acquirer processor, an issuer bank associated with a transaction card, an issuer processor, a remote payment processing system, and/or a biller. The IVO module 28 may be associated with the interchange network 16 or with an outside third party in a contractual relationship with the interchange network 16. It is noted that the payment card network system 10 may include more, fewer, or alternative components and/or perform more, fewer, or alternative actions, including those discussed elsewhere herein.

Figure 3:
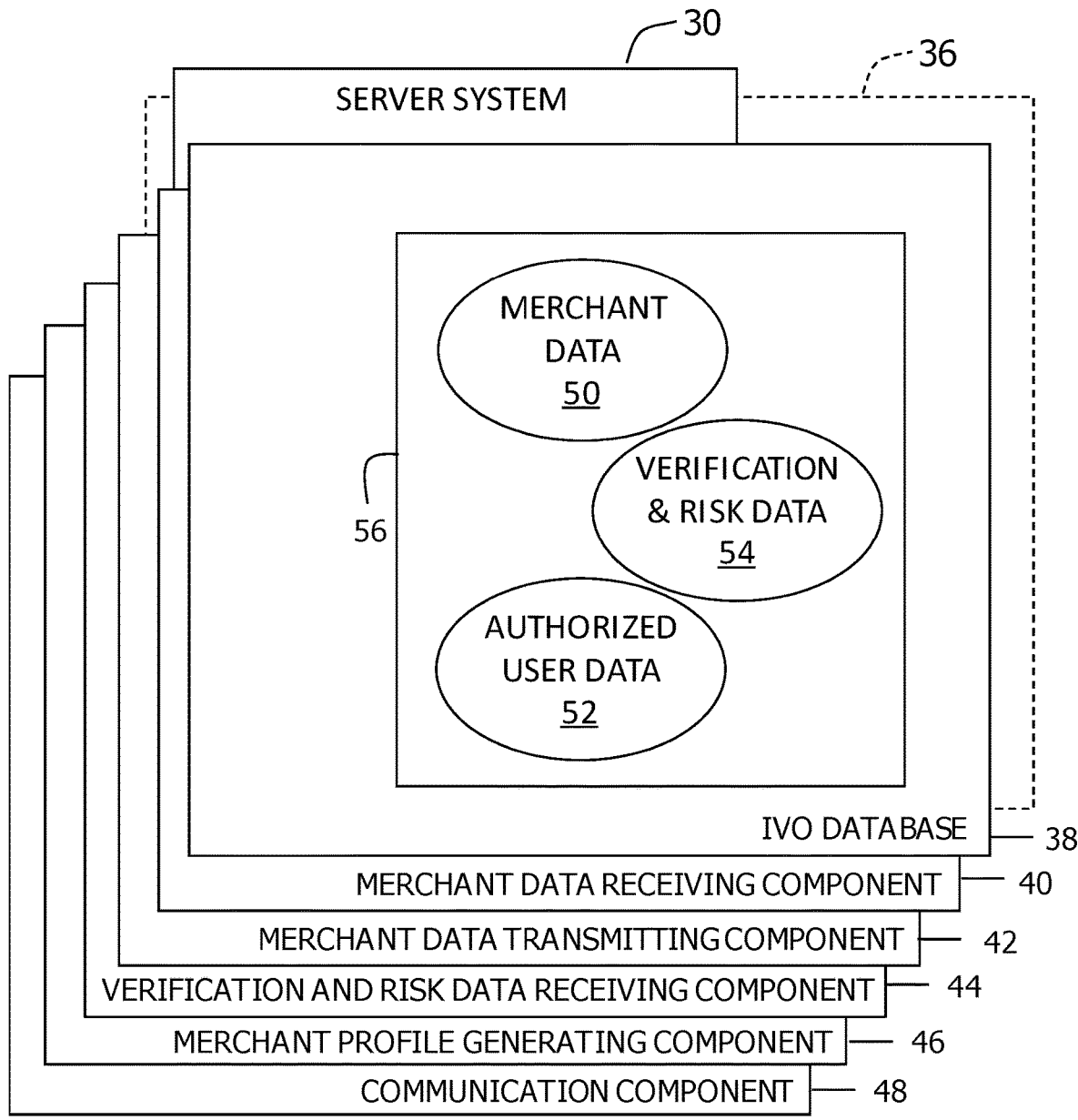
FIG. 3 shows a configuration of an IVO database within a database server of a server system of the system shown in FIG. 2.

FIG. 3 shows a configuration of the IVO database 38 within the database server 36 of the server system 30 with other related server components. More specifically, FIG. 3 shows a configuration of the IVO database 38 in communication with the database server 36 of the server system 30 shown in FIG. 2. The IVO database 38 is coupled to several separate components within the server system 30, which perform specific tasks.

The server system 30 includes a merchant data receiving component 40 for receiving the merchant identification data and the authorized user data corresponding to the merchant 12 being onboarded by the interchange network 16 (shown in FIG. 1). The server system 30 also includes a merchant data transmitting component 42 for transmitting the received merchant identification data to a third-party service (not shown in FIG. 3) for vetting the merchant 12 based on the merchant identification data. In addition, the server system 30 includes a verification and risk data receiving component 44 for receiving verification and risk data from the third-party service. Moreover, the server system 30 includes a merchant profile generating component 46 for generating a merchant profile including the merchant identification data, the user data, and the verification and risk data. Furthermore, the server system 30 includes a communication component 48 for communicating with one or more external systems (not shown in FIG. 3) or interchange network services 26 (shown in FIG. 1) to transmit and/or receive data associated with the merchant profile 56.

In an example embodiment, the interchange network 16 (shown in FIG. 1) includes an administrative component (not shown) that provides an input component as well as an edit component to facilitate administrative functions. The interchange network 16 is flexible to provide other alternative types of reports and is not constrained to the options set forth above.

In one example embodiment, the IVO database 38 is divided into a plurality of sections, including but not limited to, a Merchant Data section 50, an Authorized User Data section 52, and a Verification and Risk Data section 54, which define the merchant profile 56 for each respective merchant 12 registered with the interchange network 16. These sections within IVO database 38 are interconnected to update and retrieve the information described herein as required.

Figure 4:
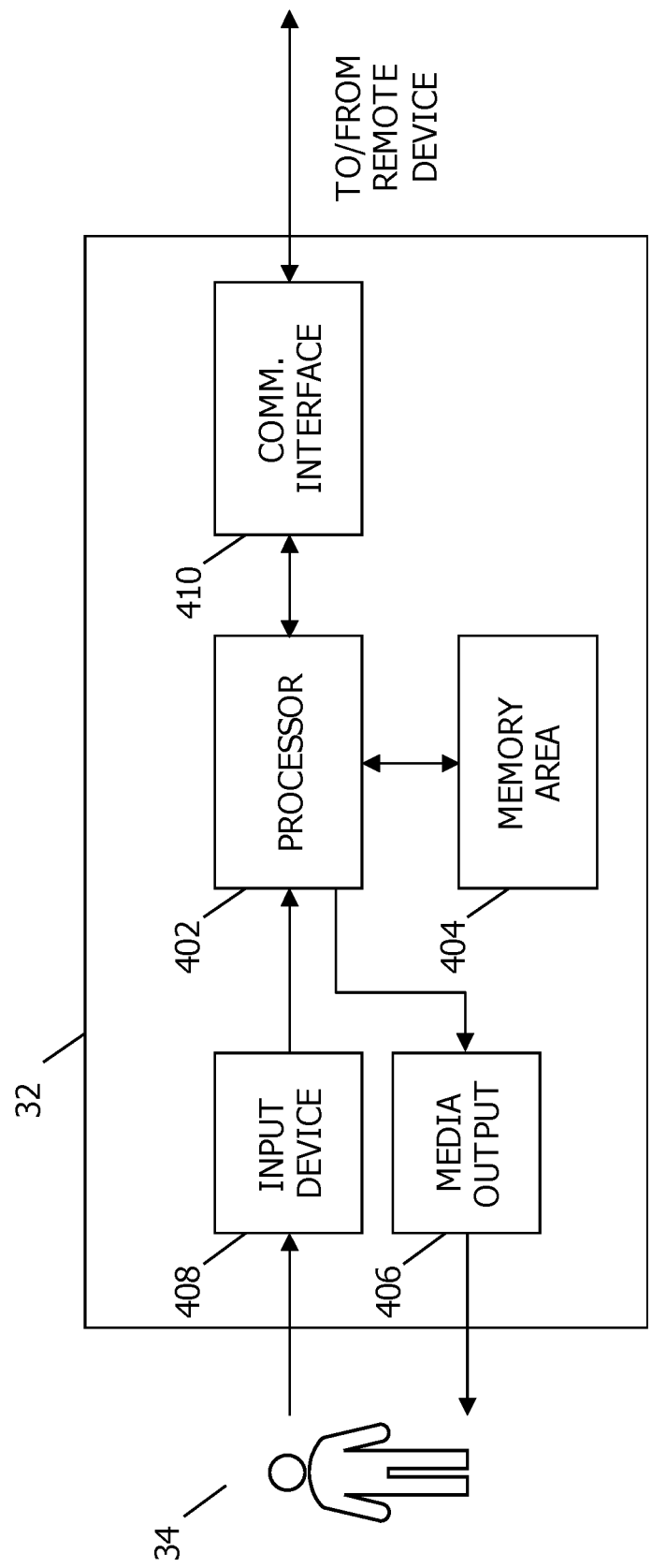
FIG. 4 illustrates an example configuration of a client system of the system shown in FIG. 2 operated by an authorized user shown in FIG. 3.

FIG. 4 illustrates an example configuration of a client system, such as the client system 32, operated by a user, such as the authorized user 34. In the example embodiment, the client system 32 includes a processor 402 for executing instructions. In some embodiments, executable instructions are stored in a memory area 404. The processor 402 may include one or more processing units, for example, a multi-core configuration. The memory area 404 is any device allowing information such as executable instructions and/or other data to be stored and retrieved. The memory area 404 may include one or more computer readable media.

The client system 32 also includes at least one media output component 406 for presenting information to the authorized user 34. The media output component 406 is any component capable of conveying information to the authorized user 34. In some embodiments, the media output component 406 includes an output adapter such as a video adapter and/or an audio adapter. An output adapter is operatively coupled to the processor 402 and operatively couplable to an output device such as a display device, a liquid crystal display (LCD), organic light emitting diode (OLED)

display, or "electronic ink" display, or an audio output device, a speaker, or headphones.

In some embodiments, the client system 32 includes an input device 408 for receiving input from the authorized user 34. The input device 408 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of the media output component 406 and the input device 408. The client system 32 may also include a communication interface 410, which is communicatively couplable to a remote device such as the server system 30. The communication interface 410 may include, for example, a wired or wireless network adapter or a wireless data transceiver for use with a mobile phone network, Global System for Mobile communications (GSM), 3G, 4G or Bluetooth or other mobile data network or Worldwide Interoperability for Microwave Access (WIMAX).

Stored in the memory area 404 are, for example, computer readable instructions for providing a user interface to the authorized user 34 via the media output component 406 and, optionally, receiving and processing input from the input device 408. A user interface may include, among other possibilities, a web browser and a client application. Web browsers enable users, such as authorized user 34, to display and interact with media and other information typically embedded on a web page or a website from server system 30. A client application allows the authorized user 34 to interact with a server application from the server system 30.

The memory area 404 may include, for example, and without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 5:
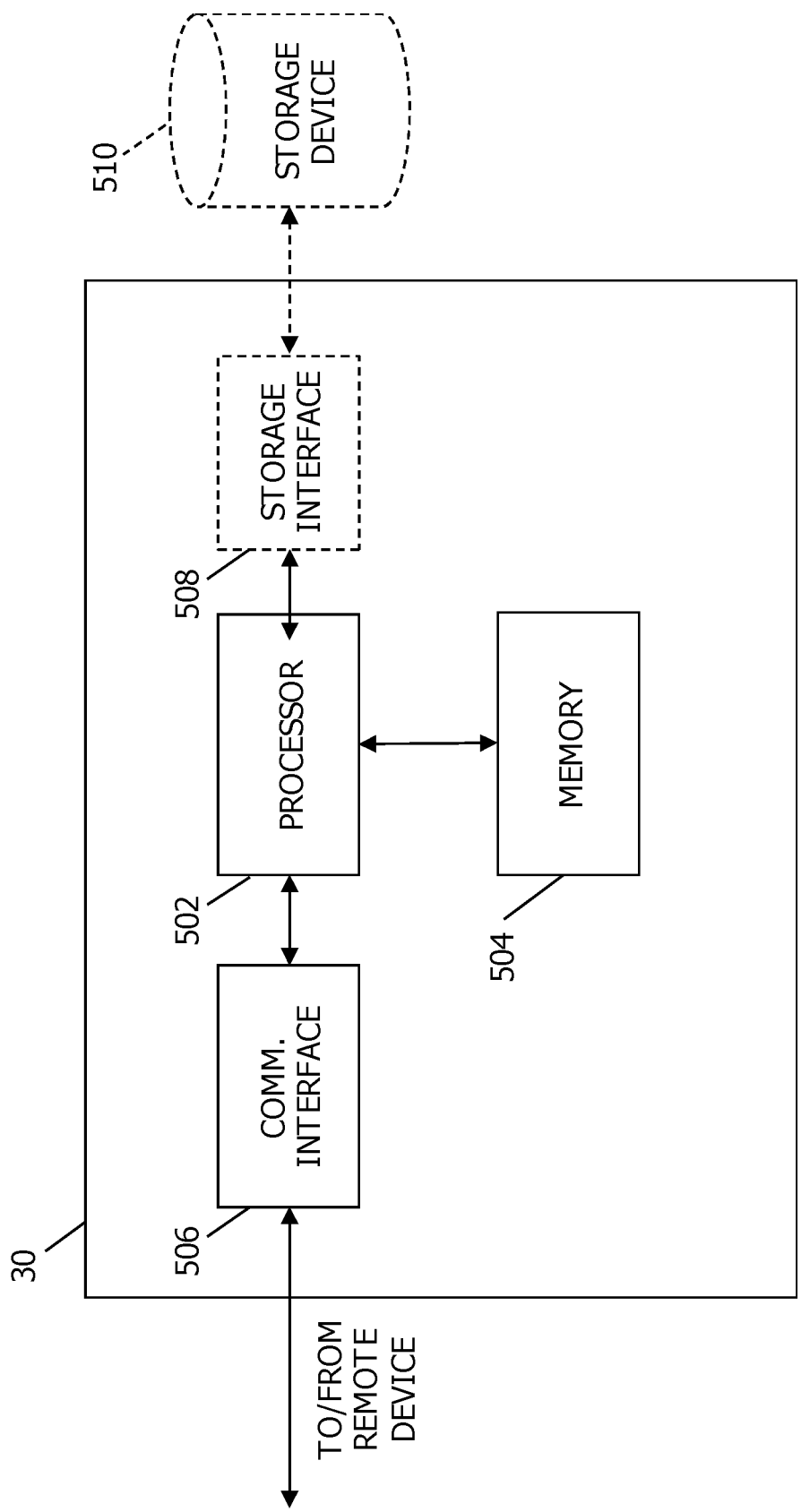
FIG. 5 illustrates an example configuration of the server system shown in FIG. 2.

FIG. 5 illustrates an example configuration of a server system, such as the server system 30 (shown in FIG. 2). In the example embodiment, the server system 30 may include, for example, and without limitation, the database server 36. The server system 30 includes a processor 502 for executing instructions. Instructions may be stored in a memory area 504, for example. The processor 502 may include one or more processing units (e.g., in a multi-core configuration) for executing instructions. The instructions may be executed within a variety of different operating systems on the server system 30, such as UNIX, LINUX, Microsoft Windows®, etc. It should also be appreciated that upon initiation of a computer-implemented method, various instructions may be executed during initialization. Some operations may be required in order to perform one or more processes described herein, while other operations may be more general and/or specific to a particular programming language (e.g., C, C#, C++, Java, or other suitable programming languages, etc.).

The processor 502 is operatively coupled to a communication interface 506 such that the server system 30 is capable of communicating with a remote device such as a client system 32 or another server system 30. For example, the communication interface 506 may receive requests from the client system 32 via the Internet, as illustrated in FIG. 2. The processor 502 may also be operatively coupled to a storage device 510. The storage device 510 is any computer-operated hardware suitable for storing and/or retrieving data. In some embodiments, the storage device 510 is integrated in the server system 30. For example, and without limitation, the server system 30 may include one or more hard disk drives as the storage device 510. In other embodiments, the storage device 510 is external to the server system 30 and may be accessed by a plurality of server systems 30. For example, and without limitation, the storage device 510 may include multiple storage units such as hard disks or solid-state disks in a redundant array of inexpensive disks (RAID) configuration. The storage device 510 may include a storage area network (SAN) and/or a network attached storage (NAS) system.

In some embodiments, the processor 502 is operatively coupled to the storage device 510 via a storage interface 508. The storage interface 508 is any component capable of providing the processor 502 with access to the storage device 510. The storage interface 508 may include, for example, and without limitation, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 502 with access to the storage device 510.

The memory area 504 may include, for example, and without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
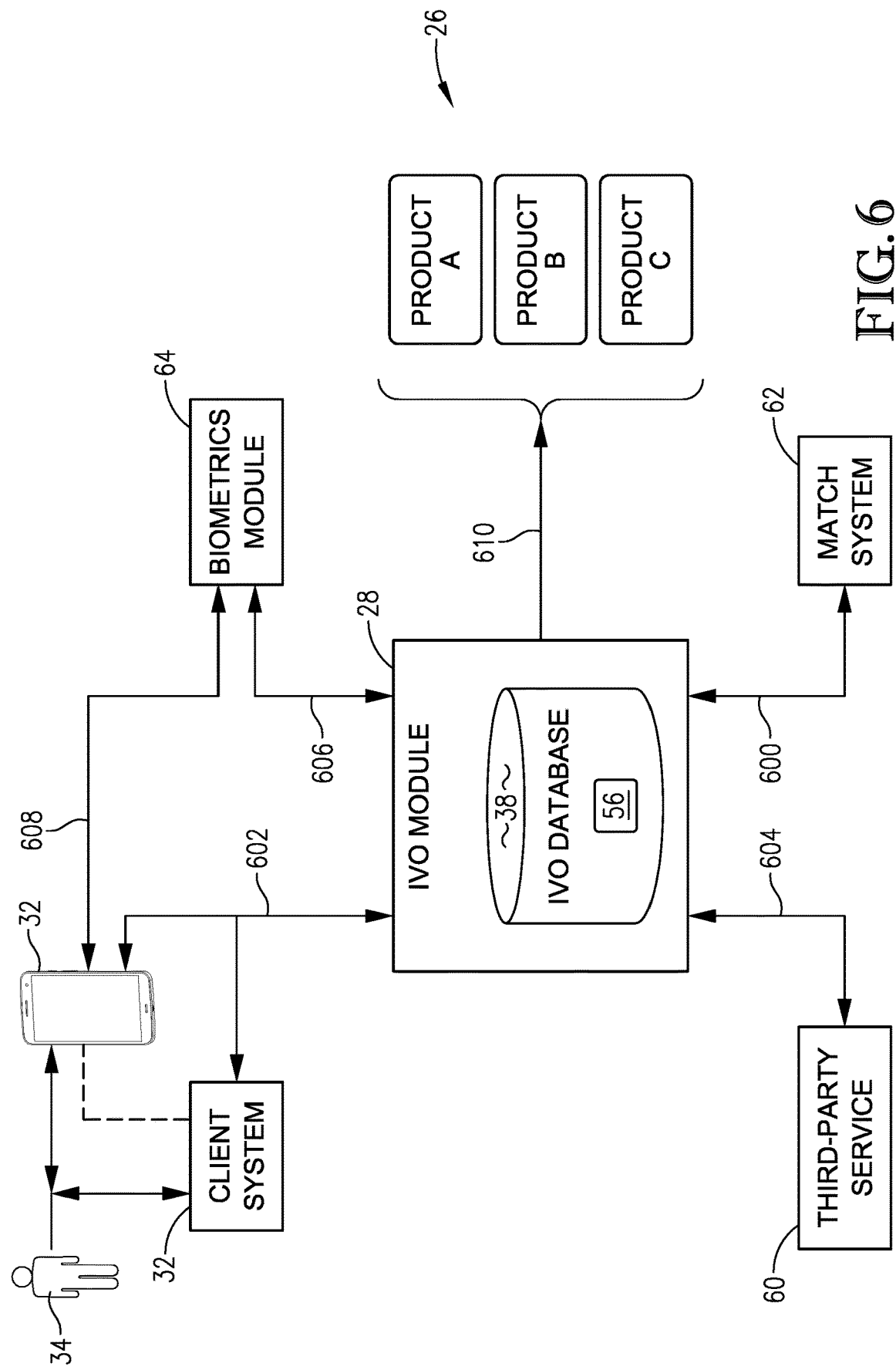
FIG. 6 is a block diagram showing operation of the IVO module shown in FIG. 1.

FIG. 6 is a block diagram showing operation of the IVO module 28. As described herein, the IVO module 28 is configured to receive various amounts of merchant identification data from the merchant 12 (shown in FIG. 1), or more particularly, the authorized user 34, and verification and risk data from a third-party service 60. The IVO module 28 is also configured to generate a merchant profile 56 and communicate the merchant profile 56 to one or more interchange network services 26. In the example embodiment, the IVO module 28 is a component of a payment network, such as payment card interchange network 16 (shown in FIG. 1).

In the example embodiment, the IVO module 28 is programmed to communicate with a MATCH system 62 to receive merchant identification data 600 for each distinct merchant 12 that is registered with the interchange network 16. The merchant identification data 600 includes, for example, and without limitation, identification data relating to the identity of each respective merchant 12 and the authorized user 34 for the respective merchant 12. Specifically, the identification data includes identifying information of the merchant 12, such as merchant name, business location, financial information, etc., and the authorized user 34, such as the user's name, business email address, password, cellular phone number, etc. The merchant identification data 600 is stored in the IVO database 38. The IVO module 28 generates a merchant profile 56 from the received merchant identification data 600 for each respective merchant 12 and assigns a merchant identifier, or merchant ID to the merchant profile 56.

In addition, the IVO module 28 is programmed to communicate with one or more client systems 32 to receive requested merchant identification data 602 to facilitate activating a merchant 12 that is not registered with the interchange network 16. The merchant activation process creates a merchant account and associated credentials for use with the interchange network 16 and/or one or more of the interchange network services 26. The authorized user 34 of the activating merchant 12 enters the requested merchant identification data 602 for transmission to the IVO module 28. The requested merchant identification data 602 includes substantially the same merchant identification data as the merchant identification data 600 available in the MATCH system 62. For example, the requested merchant identification data 602 includes identification data relating to the identity of the activating merchant 12 and the authorized user 34 for the activating merchant 12. Specifically, the identification data includes merchant name, business location, financial information, etc., and the authorized user 34, such as the user's name, business email address, password, cellular phone number, etc. The requested merchant identification data 602 is stored in the IVO database 38. The IVO module 28 generates a merchant profile 56 from the requested merchant identification data 602 for the merchant 12 and assigns a merchant ID to the merchant profile 56.

In some example embodiments, the IVO module 28 may be further programmed to receive verification and risk data 604 from the third-party service 60. The verification and risk data 604 may include, for example: verification information relating to the merchant's business location, hours of operation, government registrations, webstore functionality, and/or other publicly available information; and risk information including, for example, a risk score based on available financial information and historical performance. The verification and risk data 604 may be stored in the IVO database 38. The IVO module 28 supplements the merchant profile 56 with the verification and risk data 604.

Furthermore, in the example embodiment, the IVO module 28 is programmed to receive a biometric profile 606 from a biometrics module 64. The biometric profile 606 may include, for example, biometrics of the authorized user 34, i.e., one or more scans or digital representations 608 of physical features of the authorized user 34, that are to be validated during user verification. The biometrics or physical features can include, for example, and without limitation, voice, fingerprint, iris, vein pattern, face, or the like. Feature data from a biometric scan or digital representation may be extracted to select features of interest. The biometric profile 606 is stored in the IVO database 38. The IVO module 28 supplements the merchant profile 56 with the biometric profile 606. The biometrics module 64 is programmed to receive the one or more scans or digital representations 608 of physical features from the client system 32, and use them to generate the biometric profile 606 and/or validate the one or more scans or digital representations 608 against biometric profile 606.

Figure 7A:
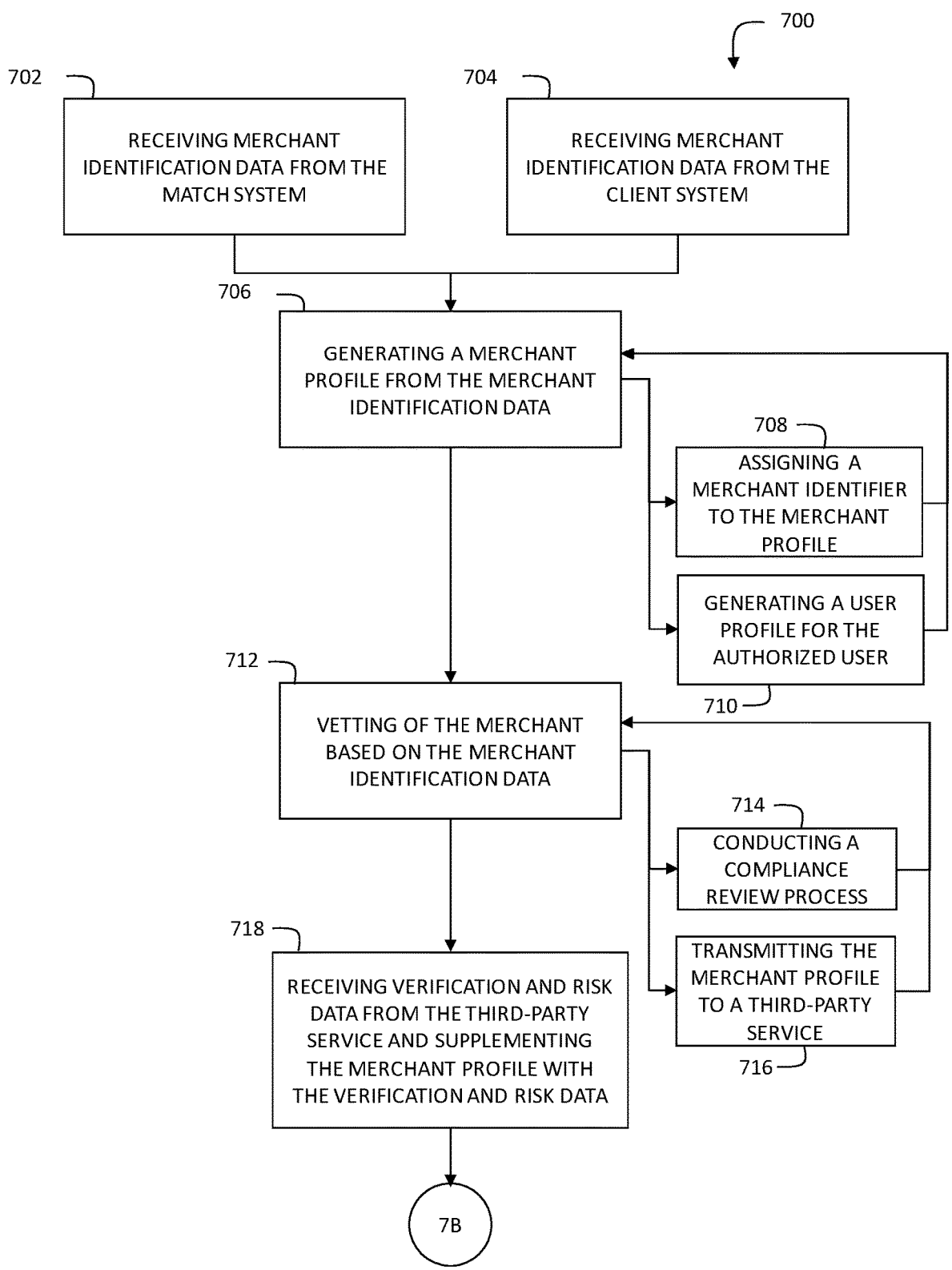
FIG. 7A is a first portion of a flow chart of an example method for identification and verification of a merchant and an associated authorized user during an onboarding process.
Figure 7B:
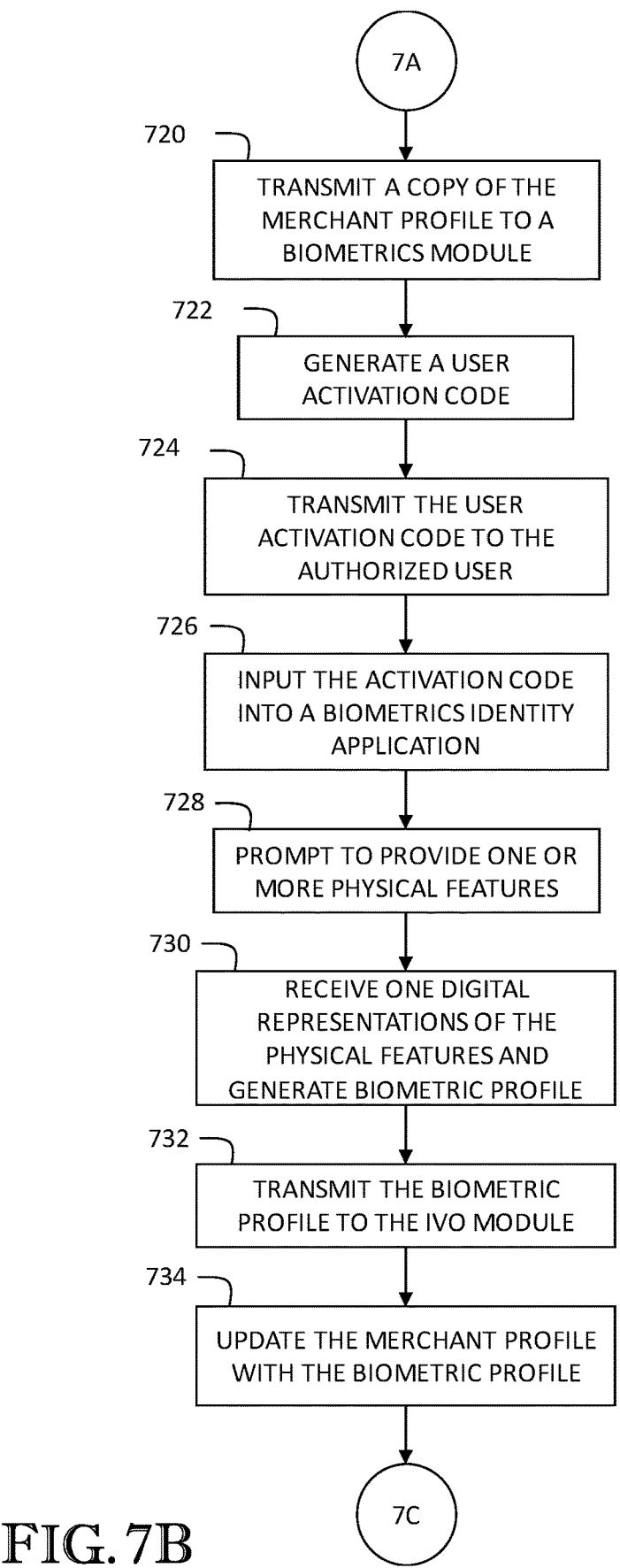
FIG. 7B is a second portion of the example method shown in FIG. 7A.
Figure 7C:
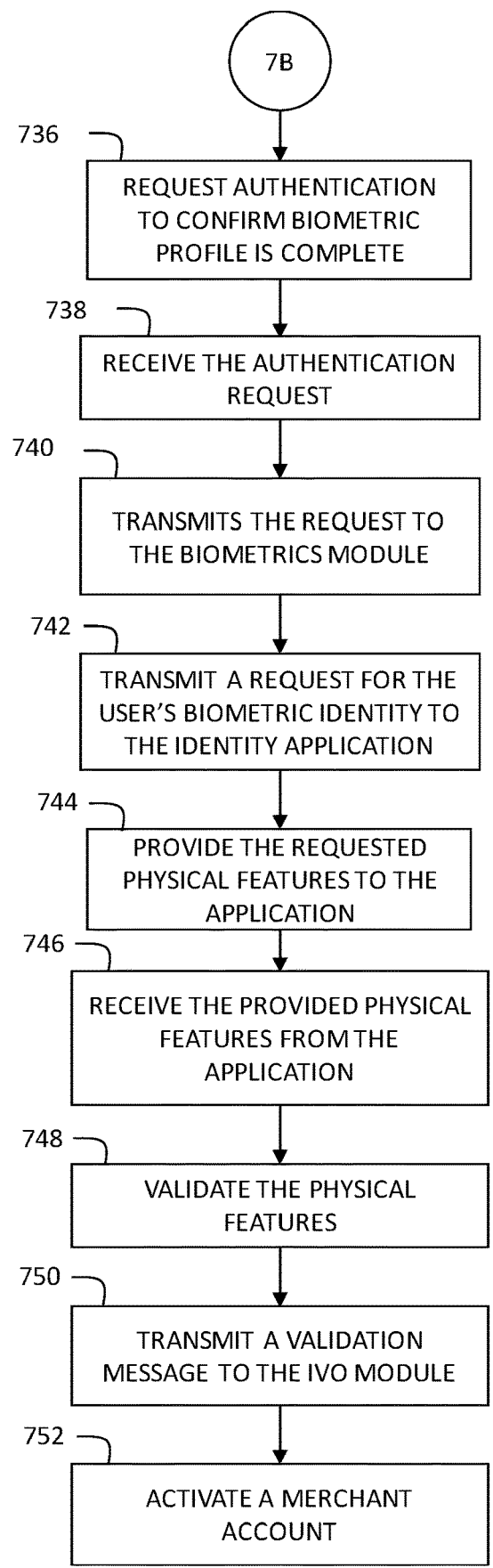
FIG. 7C is a third portion of the example method shown in FIG. 7B.

FIGS. 7A-7C show a flow chart of an example method 700 for identification and verification of a merchant 12 (shown in FIG. 1) and associated authorized user 34 (shown in FIG. 2) during an onboarding process. In the example embodiment, the method 700 is implemented by the IVO module (shown in FIG. 6). The method 700 is a computer-implemented method for identifying and verifying the merchant 12 and one or more authorized users 34 of the merchant 12 during onboarding of the merchant with the interchange network 16 (shown in FIG. 1).

In the example embodiment, the method 700 includes receiving 702 merchant identification data 600 (shown in FIG. 6) from the MATCH system 62 (shown in FIG. 6) for each distinct merchant 12 that is registered with the interchange network 16. The merchant identification data 600 is stored in the IVO database 38 (shown in FIG. 6). Moreover, the method 700 includes receiving 704 requested merchant identification data 602 (shown in FIG. 6) from client systems 32 (shown in FIG. 6) to facilitate activating a merchant 12 that is not registered with the interchange network 16. The merchant activation process includes creating a merchant account and associated credentials for use with the interchange network 16 and/or one or more of the interchange network services 26. The authorized user 34 of the activating merchant 12 enters the requested merchant identification data 602, for example, via a merchant activation application. The method 700 includes generating 706 a merchant profile 56 (shown in FIG. 6) from the merchant identification data 600 and/or requested merchant identification data 602 for each respective merchant 12. Generation of the merchant profile 56 may include, for example, assigning 708 a merchant identifier, or merchant ID to the merchant profile 56, and generating 710 a user profile for the authorized user 34 associated with the merchant 12.

In addition, the method 700 includes vetting 712 of the merchant 12 based on the merchant identification data 600 and/or 602 to verify the merchant 12. In one example, vetting of the merchant 12 includes verifying the merchant's Internet domain and email domain. In addition, the vetting process includes, for example, conducting 714 a compliance review or merchant approval process in which a business name is compared to a high-risk list of merchants or a model is employed to calculate risk of the merchant. For example, the merchant 12 is screened to comply with restrictions, sanctions, reporting requirements, and/or other regulations imposed by the Office of Foreign Assets Control (OFAC) of the United States Treasury. Such compliance measures may include processes to screen both new merchants 12 and existing merchants 12 received from the MATCH system 62 to detect persons or entities that may be on the OFAC list of Specially Designated Nationals or who may be subject to other OFAC sanctions. Moreover, vetting of the merchant includes transmitting 716 the merchant profile 56 to the third-party service 60 (shown in FIG. 6) for additional vetting of the merchant 12. For example, in one embodiment, the third-party service 60 may verify information relating to the merchant's business location, hours of operation, government registrations, webstore functionality, and/or other publicly available information; and provide risk information including, for example, a risk score based on available financial information and the merchant's historical performance. The additional information may be compiled into verification and risk data 604. The method further includes receiving 718 the verification and risk data 604 (shown in FIG. 6) from the third-party service 60 and supplementing the merchant profile 56 with the verification and risk data 604.

After the merchant profile 56 is complete and the merchant 12 has been onboarded with the interchange network 16, the method 700 proceeds with authenticating the authorized user 34, as shown in FIGS. 7B and 7C. Referring to FIG. 7B, in the example embodiment, the method 700 transmits 720 a copy of the merchant profile 56 to the biometrics module 64 (shown in FIG. 6). Upon receipt of the merchant profile 56, which includes the user profile for the authorized user 34, the biometrics module 64 generates 722 a user activation code. As described herein, vetting of the merchant 12 includes verifying the merchant's Internet domain and email domain. If the user's business email address contained in the merchant profile 56 has a domain matching the merchant's verified email domain, the biometrics module 64 transmits 724 the user activation code to the authorized user 34 via the user's business email address.

In the example method 700, the user 34 inputs 726 the activation code into a biometrics identity application installed, for example, on the client system 32, such as the user's cellular phone or a computer including one or more biometric sensors. For example, the user 34 receives the email containing the activation code from the biometrics module 64. In one example, the user opens the email and may be provided with a hyperlink to the biometrics identity application for installing on the client system 32. The user may install the biometrics identity application and enters the activation code into the application. The user may then be prompted to provide 728 one or more physical features to the application via a biometric sensor coupled to the client system 32. The method 700 further includes receiving 730 one or more scans or digital representations 608 (shown in FIG. 6) of the physical features of the authorized user 34 and generates the biometric profile 606 (shown in FIG. 6) for the user 34. The biometric module 64 transmits 732 the biometric profile 606 to the IVO module 28, which updates 734 the merchant profile 56 with the biometric profile 606.

After the merchant profile 56 is updated to include the biometric profile 606, the method 700 further includes additional authentication operations for finalizing authentication of the authorized user 34 before activating the user's account. In the example embodiment, the method 700 proceeds with the user 34 requesting 736 authentication to confirm that the biometric profile is complete. For example, in one embodiment, the user may request authentication via the biometrics identity application to complete the user account activation process. The IVO module 28 receives 738 the authentication request and transmits 740 the request to the biometrics module 64. Upon receiving the request from the IVO module 28, the biometrics module 64 transmits 742 a request for the user's biometric identity to the identity application installed on the client system 32 requesting the user 34 to provide the one or more physical features to the application via the biometric sensor coupled to the client system 32. The user 34 then provides 744 the requested physical features to the application.

The method 700 further includes receiving 746 the provided physical features from the application as the one or more scans or digital representations 608. The one or more scans or digital representations 608 are validated 748 by the biometric module 64 by comparing the received one or more scans or digital representations 608 to the user's biometric profile 606. Upon validation of the one or more scans or digital representations 608, the biometric module 64 transmits 750 a validation message to the IVO module 28 indicating that the user 34 is authorized to access the interchange network 16. The method further includes activating 752 a merchant account associated with the merchant profile 56 and the authorized user's profile. At this point the merchant profile 56 is complete and the authorized user may access the interchange network 16 to utilize the one or more services 26 (shown in FIG. 6).

In the exemplary embodiment, after the merchant profile 56, including the primary authorized user profile, is complete, the IVO module 28 does not provide authorization to a secondary user. For example, if a secondary user attempts to sign on to the interchange network under one of the verified merchant accounts, the IVO module 28 will reject the request. In addition, the IVO module will notify the primary authorized user 34 of the attempted creation of a secondary user account, for example via an email message sent to the user's business email address. The primary authorized user 34 may initiate authorization of the secondary user. In such an embodiment, the secondary user may create a secondary user profile by proceeding through substantially similar operations as described herein with respect to the exemplary method 700. It is noted that the computer-implemented method 700 may include more, fewer, or alternative operations, including those discussed elsewhere herein.

Any actions, functions, operations, and the like recited herein may be performed in the order shown in the figures and/or described above, or may be performed in a different order. Furthermore, some operations may be performed concurrently as opposed to sequentially. Although the computer-implemented method is described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon. The computer program preferably instructs one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processor," "processing element," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are illustrative only, and are thus not intended to limit in any way the definition and/or meaning of the term "processor." In particular, a "processor" may include one or more processors individually or collectively performing the described operations. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above described memory types are examples only, and are thus not limiting as to the types of memory usable for storage of a computer program.

The terms "computer," "computing device," "computer system," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "network," "communications network," and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short-range communications protocols.

The term "communication component," "communication interface," and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory area," "storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An identity verification system for client identification and verification, said identity verification system comprising:
   a memory device for storing data; and
   a processor communicatively coupled to said memory device, said processor programmed to:
      receive merchant identification data corresponding to a merchant, the merchant identification data including identification data relating to the identity of the merchant and a primary authorized user for the merchant;
      generate a merchant profile from the merchant identification data for the merchant;
      generate an activation code for authenticating the primary authorized user based on the merchant profile;
      transmit the activation code to the primary authorized user;
      receive, from the primary authorized user in response to the activation code, one or more biometrics of the authorized user;
      validate the one or more biometrics of the authorized user; and
      upon validation of the biometrics, activate a merchant account.

2. The identity verification system in accordance with claim 1,
   said processor programmed to assign a merchant identifier to the merchant profile.

3. The identity verification system in accordance with claim 1,
   said processor programmed to generate a user profile for the primary authorized user from the merchant identification data for the merchant.

4. The identity verification system in accordance with claim 1,
   said processor programmed to vet the merchant based on the merchant identification data to verify the merchant.

5. The identity verification system in accordance with claim 4,
   said vetting of the merchant includes said processor further programmed to screen the merchant for compliance with one or more of the following: restrictions, sanctions, reporting requirements, and other regulations imposed by the Office of Foreign Assets Control (OFAC) of the United States Treasury.

6. The identity verification system in accordance with claim 4,
   said vetting of the merchant includes said processor further programmed to:
      transmit the merchant profile to a third-party service for additional vetting of the merchant, the additional vetting including compiling verification and risk data corresponding to the merchant; and
      receive the verification and risk data from the third-party service for supplementing the merchant profile.

7. The identity verification system in accordance with claim 1,
   further comprising a biometrics module programmed to generate a biometric profile of the primary authorized user based on the one or more biometrics of the authorized user.

8. The identity verification system in accordance with claim 1,
   said receiving merchant identification data includes said processor further programmed to receive the merchant identification data from a database containing merchant identification data corresponding to a plurality of merchants.

9. The identity verification system in accordance with claim 1,
   said receiving merchant identification data includes said processor further programmed to receive the merchant identification data from the primary authorized user for the merchant via a client system coupled in communication to said processor.

10. A computer-implemented method for client identification and verification, the method performed by an identity verification and onboarding (IVO) module of a server system, said method comprising:
   receiving merchant identification data corresponding to a merchant, the merchant identification data including identification data relating to the identity of the merchant and a primary authorized user for the merchant;
   generating a merchant profile from the merchant identification data for the merchant;
   generating an activation code for authenticating the primary authorized user based on the merchant profile;

transmitting the activation code to the primary authorized user;

receiving, from the primary authorized user in response to the activation code, one or more biometrics of the authorized user;

validating the one or more biometrics of the authorized user; and upon validation of the biometrics, activating a merchant account via the IVO module.

11. The method in accordance with claim 10, wherein receiving merchant identification data comprises:

receiving the merchant identification data from a database containing merchant identification data corresponding to a plurality of merchants.

12. The method in accordance with claim 10, wherein receiving merchant identification data comprises:

receiving the merchant identification data from the primary authorized user for the merchant via a client system coupled in communication to said processor.

13. The method in accordance with claim 10, further comprising assigning a merchant identifier to the merchant profile.

14. The method in accordance with claim 10, further comprising generating a user profile for the primary authorized user from the merchant identification data for the merchant.

15. The method in accordance with claim 10, further comprising one or more of the following:

screening the merchant for compliance with one or more of the following: restrictions, sanctions, reporting requirements, and other regulations imposed by the Office of Foreign Assets Control (OFAC) of the United States Treasury; and transmitting the merchant profile to a third-party service for vetting of the merchant, said vetting comprising compiling verification and risk data corresponding to the merchant.

16. The method in accordance with claim 15, further comprising:

receiving the verification and risk data from the third-party service; and supplementing the merchant profile with the verification and risk data.

17. The method in accordance with claim 10, further comprising generating a biometric profile of the primary authorized user based on the one or more biometrics of the authorized user.

18. One or more non-transitory computer-readable storage media having computer-executable instructions embodied thereon, wherein when executed by at least one processor, the computer-executable instructions cause the processor to:

receive merchant identification data corresponding to a merchant, the merchant identification data including identification data relating to the identity of the merchant and a primary authorized user for the merchant;

generate a merchant profile from the merchant identification data for the merchant;

generate an activation code for authenticating the primary authorized user based on the merchant profile;

transmit the activation code to the primary authorized user;

receive, from the primary authorized user in response to the authentication code, one or more biometrics of the authorized user;

validate the one or more biometrics of the authorized user; and upon validation of the biometrics, activate a merchant account.

19. The computer-readable storage media in accordance with claim 18, wherein the computer-executable instructions further cause the processor to:

generate a user profile for the primary authorized user from the merchant identification data for the merchant.

20. The computer-readable storage media in accordance with claim 18, wherein the computer-executable instructions further cause the processor to:

screen the merchant for compliance with one or more of the following: restrictions, sanctions, reporting requirements, and other regulations imposed by the Office of Foreign Assets Control (OFAC) of the United States Treasury;

transmit the merchant profile to a third-party service for vetting of the merchant, said vetting comprising compiling verification and risk data corresponding to the merchant;

receive the verification and risk data from the third-party service; and supplement the merchant profile with the verification and risk data, and compliance screening data.

* * * * *